(12) United States Patent
Nyström et al.

(10) Patent No.: US 6,185,244 B1
(45) Date of Patent: Feb. 6, 2001

(54) CELL SEARCHING IN A CDMA COMMUNICATIONS SYSTEM

(75) Inventors: Per Johan Anders Nyström, Stockholm; Karim Jamal, Vällingby, both of (SE); Raiz Esmailzadeh, Yokohama (JP); Yi-Pin Eric Wang, Cary, NC (US)

(73) Assignee: Telefonaktiebolaget LM Ericsson (SE)

( * ) Notice: Under 35 U.S.C. 154(b), the term of this patent shall be extended for 0 days.

(21) Appl. No.: 09/129,151

(22) Filed: Aug. 5, 1998

Related U.S. Application Data

(60) Provisional application No. 60/057,412, filed on Aug. 29, 1997.

(51) Int. Cl.$^7$ .................................................. H04L 27/30
(52) U.S. Cl. ............................................ 375/145; 375/149
(58) Field of Search .................................... 375/140, 141, 375/145, 149, 146

(56) References Cited

U.S. PATENT DOCUMENTS

| | | |
|---|---|---|
| 3,358,083 | 12/1967 | Helm . |
| 5,193,094 | 3/1993 | Viterbi ................................... 371/43 |
| 5,349,589 | 9/1994 | Chennakeshu et al. ............... 371/43 |
| 5,355,376 | 10/1994 | Cox et al. .............................. 371/43 |
| 5,369,671 | 11/1994 | Yehushua et al. ..................... 375/94 |
| 5,559,829 | 9/1996 | Le Strat et al. ..................... 375/206 |
| 5,796,776 * | 8/1998 | Lomp et al. ..................... 375/140 X |
| 5,991,330 | 11/1999 | Dahlman et al. . |

FOREIGN PATENT DOCUMENTS

| | | |
|---|---|---|
| PCT/SE 98/01518 | 1/1999 | (WO) . |

OTHER PUBLICATIONS

Higuchi et al, "Fast Cell Search Algorithm using Long Code Masking in DS–CDMA Asynchronous Cellular System," Tech. Rep. of IEICE, DSP96–116, SAT96–11, RCS96–122 (1997–01), pp. 57–63, Jan. 1997 (in Japanese). Abstract translated.

A. Baier, et al., Design Study for a CDMA–Based Third Generation Mobile Radio System, IEEE Journal, Selected Areas in Communications, vol. 12, No. 4., pp. 733–743, May, 1994.

R. Cox, C–E. Sundberg, An Efficient Adaptive Circular Viterbi Algorithm for Decoding Generalized Tailbiting Convolutional Codes, IEEE Transactions on Vehicular Technology, vol. 43, No. 1, pp. 57–68, Feb., 1994.

K. Higuchi, et al., Fast Cell Search Algorithm in DS–CDMA Mobile Radio Using Long Spreading Codes, 1997 IEEE 47th. Vehicular Technology Conference, Phoenix, May 4–7, 1997, vol. 3, No. CONF. 47, May 4, 1997, pp. 1430–1434, XP000738598.

I. M. Pyshkin, et al., Synthesis of Composite Signal Systems with Periodic Correlation Properties, Radiotekhnika I Elektronika, Sep. 1983, USSR, vol. 28, No. 9, pp. 1744–1752, XP002088632, ISSN 0033–8494.

* cited by examiner

Primary Examiner—Joseph L. Felber
(74) Attorney, Agent, or Firm—Jenkens & Gilchrist

(57) ABSTRACT

A special coding scheme is disclosed for more effectively acquiring a long code and frame timing during a cell search in a CDMA communications system. A code set of length M Q-ary code words including symbols from a set of Q short codes is defined with certain properties. The primary property to be satisfied is that no cyclic shift of a code word yields a valid code word. The other properties to be satisfied are that there is a one-to-one mapping between a long code message and a valid code word, and a decoder should be able to find both the random shift (thereby implicitly finding the frame timing) and the transmitted code word (i.e., its associated long code indication message) in the presence of interference and noise, with some degree of accuracy and reasonable complexity.

16 Claims, 9 Drawing Sheets

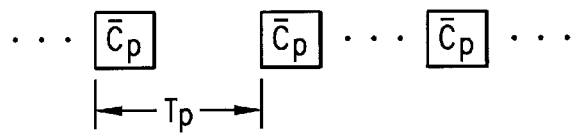
FIG. 1 (PRIOR ART)
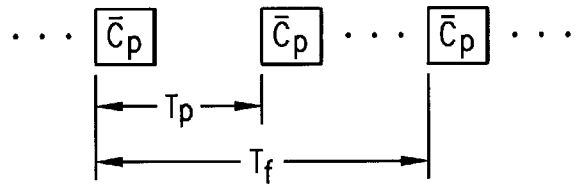
FIG. 2 (PRIOR ART)
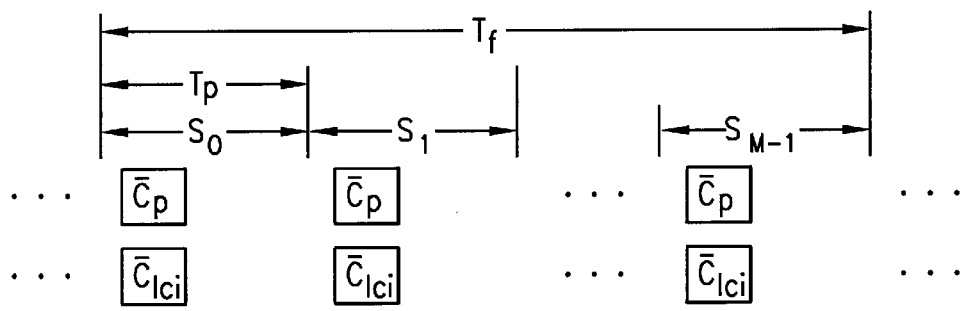
FIG. 3 (PRIOR ART)
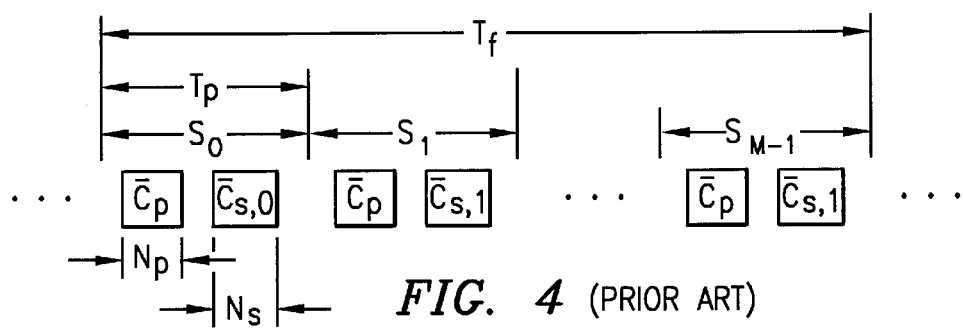
FIG. 4 (PRIOR ART)
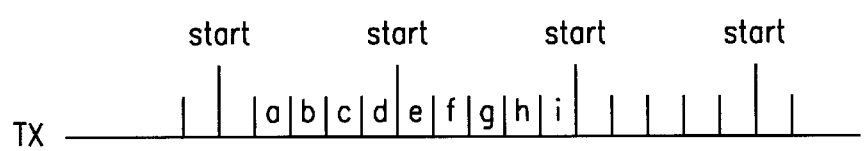
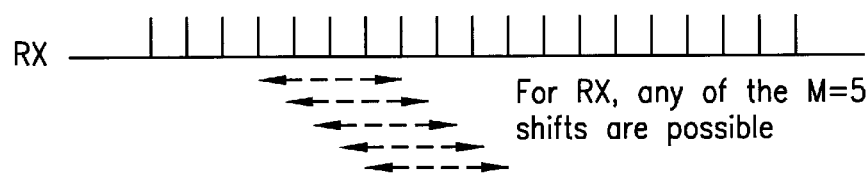
FIG. 5

```
00000->00000 , p=1, repr.: 00000
00001->00010->00100->01000->10000->00001, p=5, repr.: 00001
00011->00110->01100->11000->10001->00011, p=5, repr.: 00011
00101->01010->10100->01001->10010->00101, p=5, repr.: 00101
00111->01110->11100->11001->10011->00111, p=5, repr.: 00111
01011->10110->01101->11010->10101->01011, p=5, repr.: 01011
01111->11110->11101->11011->10111->01111, p=5, repr.: 01111
11111->11111, p=1, repr.: 11111
```

```
M=5;
code=[]; % will contain the set of code words
used=zeros(1,2^M-1); % keep track of words that are necessary to test
for i=1:2^M-1 % exclude all-zero sequence where p=1, always
if (used(i)==0) % if potential candidate, calculate period
x=i;
codeshifts=[i]; % first word in p-cycle
bad=0; % flag set if p<M
for j=1:M-1 % x==i after M shifts, of course
x=2*x; % shift
if (x>=2^M) x=x-2^M+1; end; % end around shift
if (x==i) bad=1; end; % is x==i after less than M shifts?
codeshifts=[codeshifts x]; % save smallest representative
used(codeshifts)=ones(size(codeshifts)); % and mark the shifts as used
end;
```

*FIG. 13*

| M | Cardinality of code set |
|---|---|
| 2 | 1 |
| 3 | 2 |
| 4 | 3 |
| 5 | 6 |
| 6 | 9 |
| 7 | 18 |
| 8 | 30 |
| 12 | 335 |
| 14 | 1161 |
| 16 | 4080 |

*FIG. 14*

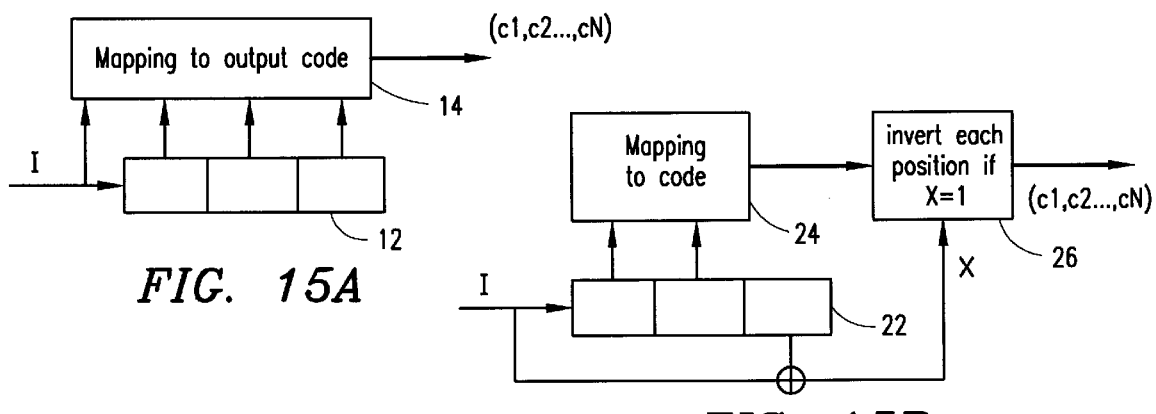

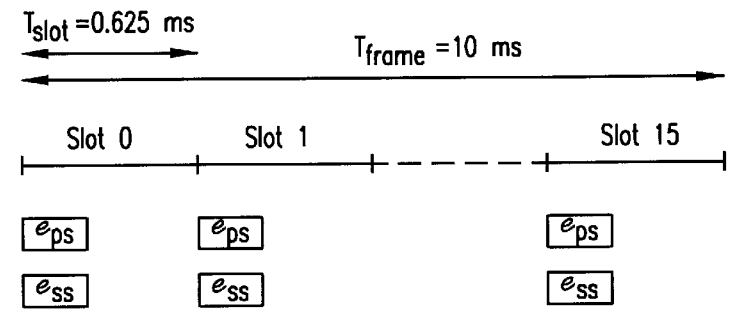
FIG. 16
| Sync. Code | Code Type | Information | | |
|---|---|---|---|---|
| | | Slot Timing Indication (STI) | Frame Timing Indication (FTI) | Long Code Indication (LCI) |
| PSC | Orth. Gold | YES | NO | NO |
| SSC | Orth. Gold | – | NO | YES |
FIG. 17
| Sync. Code | Code Type | Information | | |
|---|---|---|---|---|
| | | Slot Timing Indication (STI) | Frame Timing Indication (FTI) | Long Code Indication (LCI) |
| PSC | Orth. Gold | YES | NO | NO |
| SSC | Orth. Gold | – | TES | YES |
FIG. 18
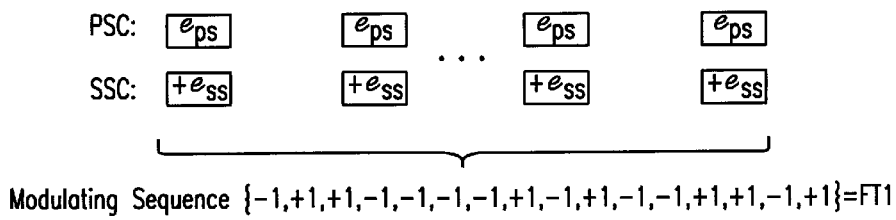
FIG. 19

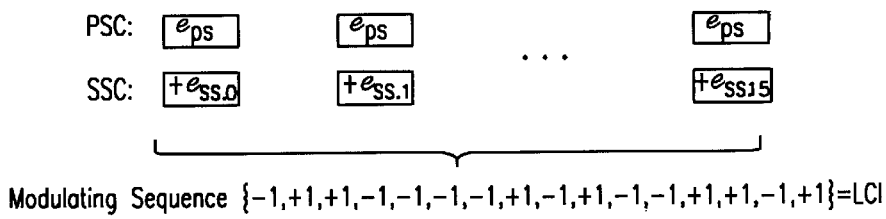

Modulating Sequence $\{-1,+1,+1,-1,-1,-1,-1,+1,-1,+1,-1,-1,+1,+1,-1,+1\}$=LCI

FIG. 20

| STEP | METHOD | | |
|---|---|---|---|
| | ARIB | PROPOSED 1 | PROPOSED 2 |
| 1 | MF->ST | MF->ST | MF->ST |
| 2 | CORR->LCI | CORR->LCI & FTI | CORR->FTI & LCI |
| 3 | CORR->LC & FT | (CORR->LC) | (CORR->LC) |

FIG. 21

| Parameter | Value |
|---|---|
| Chip Rate | 4.096 Mc/s |
| Symbol Rate of the physical channel that carries BCCH | 16 kSymbols/s |
| Frame Length | 10 ms |
| Slots per Frame | 16 |
| Symbols per Slot | 10 |
| Chips per Symbol | 256 |
| Number of correlator units in MS | 16 |
| Number of coherently accumulated 256-chip correlations needed for sufficient noide/fading suppression | 16 |
| Number of non-coherently accumulated 256-chip correlations needed for sufficient noise/fading suppression | 32 |
| Number of long codes in the system | 256 |
| Long Code Grouping | 1X256, 4x32 16x16, 32x4 |

FIG. 22

| STEP | PROC | ARIB | METHOD 1 | METHOD 2 |
|---|---|---|---|---|
| 2 | CORR | Max 16x16x16= 4096, Avg 2048 | Max 16x16x16= 4096, Avg 2048 | 16x16=256 |
|  | DELAY | Max 16 Frames, Avg 8 Frames | Max 16 Frames, Avg 8 Frames | 1 Frame |
| 3 | CORR | 16x16=256 | No further correlations needed | No further correlations needed |
|  | DELAY | 16 Symbols=1.6 Slots | No further delay | No further delay |
| Total | CORR (avg) | 2048+256=2304 | 2048 | 256+2048=256 |
|  | DELAY (avg) | 8 Frames+1.6 Slots =8.1 Frames | 8 Frames | 1 Frame |

FIG. 23A

| STEP | PROC | ARIB | METHOD 1 | METHOD 2 |
|---|---|---|---|---|
| 2 | CORR | 4x16=64 | 4x16=64 | 16x16=256 |
|  | DELAY | 1 Frame | 1 Frame | 1 Frame |
| 3 | CORR | Max 16x32x32= 16384, Avg 8192 | Max 32x32=1024, Avg 512 | Max 32x32=1024, Avg 512 |
|  | DELAY | Max 1024 Symbols =102.4 Slots=6.4 Frames, Avg 3.2 Frames | Max 64 Symbols= 6.4 Slots=0.4 Frames, Avg 0.2 frames | Max 64 Symbols= 6.4 Slots=0.4 Frames, Avg 0.2 frames |
| Total | CORR (avg) | 64+8192=8256 | 64+512=576 | 256+512=768 |
|  | DELAY (avg) | 1 Frame+3.2 Frames=4.2 Frames | 1 Frame+0.2 Frames=1.2 Frames | 1 Frame+1.6 Slots =1.2 Frames |

FIG. 23B

| STEP | PROC | ARIB | METHOD 1 | METHOD 2 |
|---|---|---|---|---|
| 2 | CORR | 16x16=256 | 16x16=256 | 16x16=256 |
| | DELAY | 1 Frame | 1 Frame | 1 Frame |
| Step 3 | CORR | Max 16x16x32=8192, Avg 4096 | Max 16x32=512 Avg 256 | Max 16x32=512 Avg 256 |
| | DELAY | Max 512 Symbols=51.2 Slots=3.2 Frames, Avg 1.6 Frames | Max 32 Symbols=3.2 Slots, Avg 1.6 Slots=0.1 Frames | Max 32 Symbols=3.2 Slots, Avg 1.6 Slots=0.1 Frames |
| Total | CORR (avg) | 256+4096=4352 | 256+256=512 | 256+256=512 |
| | DELAY (avg) | 1 Frame+1.6 Frames=2.6 Frames | 1 Frame+0.1 Frames=1.1 Frames | 1 Frame+0.1 Frames=1.1 Frames |

*FIG. 23C*

| STEP | PROC | ARIB | METHOD 1 | METHOD 2 |
|---|---|---|---|---|
| 2 | CORR | Max 16x2x16=512, Avg 256 | | 16x16=256 |
| | DELAY | Max 2 Frames, Avg 1 Frame | | 1 Frame |
| 3 | CORR | Max 4x16x32=512, Avg 256 | 4x32=128 | 4x32=128 |
| | DELAY | Max 128 Symbols=12.8 Slots=0.8 Frames, Avg 0.6 Frames | 32 Symbols=3.2 Slots=0.2 Frames | 32 Symbols=3.2 Slots=0.2 Frames |
| Total | CORR (avg) | 256+1024=1280 | 256+128=384 | 256+128=384 |
| | DELAY (avg) | 1 Frame+0.6 Frames=1.6 Frames | 1 Frame+0.2 Frames=1.2 Frames | 1 Frame+0.2 Frames=1.2 Frames |

*FIG. 23D*

CELL SEARCHING IN A CDMA COMMUNICATIONS SYSTEM

RELATED APPLICATION

This Application for Patent claims the benefit of priority from, and hereby incorporates by reference the entire disclosure of, co-pending U.S. Provisional Application for Patent Serial No. 60/057,412, filed Aug. 29, 1997.

BACKGROUND OF THE INVENTION

1. Technical Field of the Invention

The present invention relates in general to the spread spectrum communications field and, in particular, to cell search activities performed by a mobile station to obtain time synchronization with a base station and acquire the cell-specific long code and frame timing information used in a code division multiple access (CDMA) communications system.

2. Description of Related Art

The cellular telephone industry has made phenomenal strides in commercial operations throughout the world. Growth in major metropolitan areas has far exceeded expectations and is outstripping system capacity. If this trend continues, the effects of rapid growth will soon reach even the smallest markets. The predominant problem with respect to such continued growth is that the customer base is expanding while the amount of electromagnetic spectrum allocated to cellular service providers for use in carrying radio frequency communications remains limited. Innovative solutions are required to meet these increasing capacity needs in the limited available spectrum, as well as to maintain high quality service and avoid rising prices.

Currently, channel access in cellular systems is primarily achieved using Frequency Division Multiple Access (FDMA) and Time Division Multiple Access (TDMA) methods. In FDMA systems, a physical communication channel comprises a single radio frequency band into which the transmission power of a signal is concentrated. In TDMA systems, a physical communications channel comprises a time slot in a periodic train of time intervals over the same radio frequency. Although satisfactory performance is being obtained from FDMA and TDMA communications systems, channel congestion due to increasing customer demand commonly occurs. Accordingly, alternate channel access methods are now being proposed, considered and implemented.

Spread spectrum is a communications technology which is finding commercial application as a new channel access method in wireless communications. Spread spectrum systems have been around since the days of World War II. Early applications were predominantly military oriented (relating to smart jamming, radar and satellites). However, there is an increasing interest today in using spread spectrum systems in other communications applications, including digital cellular radio, land mobile radio, and indoor/outdoor personal communication networks.

Spread spectrum operates quite differently from conventional TDMA and FDMA communications systems. In a direct sequence-CDMA (DS-CDMA) spread spectrum transmitter, for example, a digital symbol stream for a given dedicated or common channel at a basic symbol rate is spread to a chip rate. This spreading operation involves applying a channel unique spreading code (sometimes referred to as a signature sequence) to the symbol stream that increases its rate (bandwidth) while adding redundancy. Typically, the digital symbol stream is multiplied by the unique digital code during spreading. The intermediate signal comprising the resulting data sequences (chips) is then added to other similarly processed (i.e., spread) intermediate signals relating to other channels. A base station-unique scrambling code (often referred to as the "long code" since it is in most cases longer than the spreading code) is then applied to the summed intermediate signals to generate an output signal for multi-channel transmission over a communications medium. The dedicated/common channel-related intermediate signals advantageously then share one transmission communications frequency, with the multiple signals appearing to be located on top of each other in both the frequency domain and the time domain. Because the applied spreading codes are channel unique, however, each intermediate signal transmitted over the shared communications frequency is similarly unique, and through the application of proper processing techniques at the receiver may be distinguished from others.

In the DS-CDMA spread spectrum mobile station receiver, the received signals are recovered by applying (i.e., multiplying, or matching) the appropriate scrambling and spreading codes to despread, or removing the coding from the desired transmitted signal and returning to the basic symbol rate. Where the spreading code is applied to other transmitted and received intermediate signals, however, only noise is produced. The despreading operation thus effectively comprises a correlation process that compares the received signal with the appropriate digital code to recover the desired information from the channel.

Before any radio frequency communications or information transfer between a base station and a mobile station of the spread spectrum communications system can occur, the mobile station must find and synchronize itself to the timing reference of that base station. This process is commonly referred to as "cell searching". In a DS-CDMA spread spectrum communications system, for example, the mobile station must find downlink chip boundaries, symbol boundaries and frame boundaries of this timing reference clock. The most common solution implemented to resolve this synchronization problem has the base station periodically transmitting (with a repetition period $T_p$), and the mobile station detecting and processing, a recognizable synchronization code $\bar{c}_p$ of length $N_p$ chips as shown in FIG. 1. The synchronization code may also be referred to as a spreading code for long code masked symbols. This synchronization code is sent with a known modulation and without any long code scrambling. In one type of CDMA communications system, each base station utilizes a different, known synchronization code taken from a set of available synchronization codes. In another type of CDMA communications system, all base stations utilize the same synchronization code, with differences between base stations being identified through the use of differing phase shifts of the synchronization code for the transmissions.

In the spread spectrum receiver of the mobile station, the received signals are demodulated and applied to a filter matched to the synchronization code(s). It is, of course, understood that alternate detection schemes, such as sliding correlation, may be used for synchronization code processing. The output of the matched filter peaks at times which correspond to the reception times of the periodically transmitted synchronization code. Due to the effects of multi-path propagation, several peaks may be detected relating to a single synchronization code transmission. From processing these received peaks in a known manner, a timing reference with respect to the transmitting base station may be found with an ambiguity equal to the repetition period $T_p$. If the repetition period equals the frame length, then this timing reference can be used to synchronize mobile station and base station communications operations with respect to frame timing.

While any length of $N_p$ in chips for the transmitted synchronization code $\bar{c}_p$ may be selected, as a practical matter the length of $N_p$ in chips is limited by the complexity of the matched filter implemented in the mobile station receiver. At the same time, it is desirable to limit the instantaneous peak power $\hat{P}_p$ of the synchronization code signal/channel transmissions in order not to cause high instantaneous interference with other spread spectrum transmitted signals/channels. To obtain sufficient average power with respect to synchronization code transmissions given a certain chip length $N_p$, it may become necessary in the CDMA communications system to utilize a synchronization code repetition period $T_p$ that is shorter than a frame length $T_f$ as illustrated in FIG. 2.

Another reason for transmitting multiple synchronization codes $\bar{c}_p$ within a single frame length $T_f$ is to support inter-frequency downlink synchronization in the compressed mode, as known to those skilled in the art. With compressed mode processing, downlink synchronization on a given carrier frequency is carried out during only part of a frame rather than across the entire frame. It is possible, then, with only one synchronization code $\bar{c}_p$ per frame, that compressed mode processing could miss over a significant time period detecting the synchronization code completely. By transmitting multiple synchronization codes $\bar{c}_p$ during each frame, multiple opportunities per frame are given for compressed mode processing detection, and at least one synchronization code transmission will be capable of being detected.

There is, however, a drawback with respect to reception and synchronization experienced with multiple synchronization code $\bar{c}_p$ transmission within a single frame length $T_f$. Again, the received signals are demodulated and applied to a filter (or correlator) matched to the known synchronization code. The output of the matched filter peaks at times that correspond to the reception times of the periodically transmitted synchronization code. From processing these peaks, a timing reference for the transmitting base station relating to the synchronization code repetition period $T_p$ may be found in a known manner. However, this timing reference is ambiguous with respect to the frame timing and thus does not present sufficient information to enable base/mobile station frame synchronization to the timing reference. By ambiguous it is meant that the boundary of the frame (i.e., its synchronization) cannot be identified from the detected synchronization code peaks alone.

The cell searching process can further involve obtaining the cell specific long code used on the downlink to scramble downlink dedicated and common channel communications. The dedicated channels comprise both traffic and control channels, and the common channels also comprise traffic and control channels (which can include the broadcast control channel or BCCH). A long code group code $\bar{c}_{lci}$ is preferably transmitted synchronously with (and further preferably orthogonal to) the synchronization codes $\bar{c}_p$ as illustrated in FIG. 3. This long code group code is sent with a known modulation and without any long code scrambling. Each long code group code $\bar{c}_{lci}$ indicates the particular subset of a total set of long codes to which the cell specific long code utilized for the transmission belongs. For example, there may be one-hundred twenty-eight total long codes grouped into four subsets of thirty-two codes each. By identifying the transmitted long code group code $\bar{c}_{lci}$, the receiver can narrow its long code acquisition search in this example to only the thirty-two long codes contained in the subset identified by the received long code group code $\bar{c}_{lci}$.

Frame timing information may be found from a combined processing of the received synchronization codes $\bar{c}_p$ and long code group codes $\bar{c}_{lci}$. A mobile station first identifies synchronization code timing by applying a $\bar{c}_p$-matched filter to a received signal and identifying peaks. From these peaks, a timing reference with respect to the slots may be found. Although ambiguous as to frame timing, the determined slot locations identify the timing for the simultaneous transmission of the long code group code $\bar{c}_{lci}$. Correlation is then performed at the known slot locations to obtain the long code group code $\bar{c}_{lci}$ identification. From this identification, the number of possible cell specific long codes used for the transmission is reduced. Lastly, a correlation is performed against each of the reduced number of long codes (i.e., those long codes contained in the $\bar{c}_{lci}$ identified subset) at each of the known slots to determine which cell specific long code is being used for the transmission, and provide a phase shift reference. Once the phase shift is found, frame timing is identified.

In connection with the transmission of multiple synchronization codes $\bar{c}_p$ within a single frame length $T_f$, the determination of frame timing is alternatively assisted in the manner disclosed in U.S. Pat. No. 5,991,330 by Dahlman et al., entitled "MOBILE STATION SYNCHRONIZATION WITHIN A SPREAD SPECTRUM COMMUNICATIONS SYSTEM", filed Jun. 27, 1997, by having each of the slots include not only a synchronization code $\bar{c}_p$ as in FIG. 2 described above, but also a framing synchronization code $\bar{c}_s$ transmitted with a known modulation and without long code scrambling, as illustrated in FIG. 4. The synchronization code is the same in each slot and across the repeating frames. The framing synchronization codes, however, are unique for each slot in a frame, and are repeated in each frame.

To obtain frame timing information, a mobile station first identifies synchronization code timing by applying a $\bar{c}_p$-matched filter to a received signal and identifying peaks. From these peaks, a timing reference with respect to the slots can be found. While this timing reference is ambiguous as to frame timing, knowledge of the slot locations indirectly points to the location of the framing synchronization code $\bar{c}_s$, within each located slot. The mobile station then further correlates the set of known framing synchronization codes $\bar{c}_s$ to the received signal at the locations of framing synchronization codes. Given that the position of each framing synchronization code $\bar{c}_s$ relative to the frame boundary is known, once a correlation match is found at the location, the boundary of the frame relative thereto (and hence, the frame timing) is then also known.

Although the foregoing methods for obtaining synchronization information can provide satisfactory results, their performance capabilities under degraded radio conditions leaves much to be desired. Inevitably, in all of the above-described prior art approaches, poor radio link conditions and higher than normal interference levels can cause a mobile station to make an incorrect decision on either the long code or frame timing, or both. Consequently, additional correlations have to be performed that occupy valuable processing resources, are complex to implement, and slow down the cell searching process. Essentially, more signal energy could be collected by receiving the signal over more frame periods. However, this approach can take longer than the time deemed acceptable for handover situations. Therefore, there is a need for an effective method of obtaining both a frame timing indication and a long code indication during the cell searching process in a degraded radio environment. As described in detail below, the present invention provides such a method.

SUMMARY OF THE INVENTION

Essentially, in accordance with the present invention, a method is provided for more effectively acquiring a long code and frame timing during a cell search, by using a special coding scheme. A code set of length M Q-ary code words including symbols from a set of Q short codes is defined with certain properties. The primary property to be satisfied is that no cyclic shift of a code word yields a valid code word. The other properties to be satisfied are that there is a one-to-one mapping between a long code message and a valid code word, and a decoder should be able to find both the random shift (thereby implicitly finding the frame timing) and the transmitted code word (i.e., its associated long code indication message) in the presence of interference and noise, with some degree of accuracy and reasonable complexity.

An important technical advantage of the present invention is that it provides a low to moderate complexity solution for more effectively acquiring a long code and frame timing during a cell search, which gives a coding gain that can be used to reduce the search time and/or required information bit energy to noise ratio (Eb/N0).

Another important technical advantage of the present invention is that it makes it possible to trade-off complexity versus performance, by varying the code complexity yet keeping the number of possible messages fixed.

Yet another important technical advantage of the present invention is that it provides more code words than conventional schemes, which reduces and/or limits the number of base station messages required.

BRIEF DESCRIPTION OF THE DRAWINGS

A more complete understanding of the method and apparatus of the present invention may be had by reference to the following detailed description when taken in conjunction with the accompanying drawings wherein:

FIG. 1 is a diagram illustrating a prior art synchronization channel signal transmission format in a direct sequence code division multiple access communications system;

FIG. 2 is a diagram illustrating an alternate prior art synchronization channel signal transmission format in a direct sequence code division multiple access communications system;

FIG. 3 is a diagram illustrating an alternate prior art synchronization channel and long code group signal transmission format in a direct sequence code division multiple access communications system;

FIG. 4 is a diagram illustrating yet another alternate prior art synchronization code and framing synchronization code transmission format in a direct sequence code division multiple access communications system;

FIG. 5 is a diagram that illustrates exemplary transmitter and receiver operations that can be used to implement the present invention;

FIG. 13 shows a Matlab listing for the synchronization code search algorithm described with respect to FIG. 12;

FIG. 14 shows the cardinality of certain synchronization codes for small values of M;

FIGS. 15A and 15B are block diagrams of exemplary trellis encoders that can be used to implement the present invention;

FIG. 16 is a diagram that illustrates the cell search method to be performed by a mobile station, as described in the prior art ARIB Wideband CDMA proposal;

FIG. 17 is a table that illustrates certain characteristics of a Primary Synchronization Code and Secondary Synchronization Code;

FIG. 18 is a table that shows information that can be provided by a Primary Synchronization Code or Secondary Synchronization Code for cell searches, in accordance with the present invention;

FIG. 19 is an exemplary method for providing the Primary Synchronization Code and Secondary Synchronization Code shown in FIG. 18 for cell searches, in accordance with the present invention;

FIG. 20 is a second exemplary method for providing the Primary Synchronization Code and Secondary Synchronization Code shown in FIG. 18 for cell searches, in accordance with the present invention;

FIG. 21 is a table that describes two cell search algorithms (methods) that can be used to implement the present invention, and also provide a comparison of the two exemplary cell search methods of the present invention with the current ARIB Wideband CDMA cell search proposal;

FIG. 22 is a table that illustrates system parameters that can be used in order to make a comparison of the algorithms (methods) shown in FIG. 21; and FIGS. 23A–D are tables that illustrate the advantages of the two cell search methods of the present invention over the proposed ARIB Wideband CDMA cell search method.

DETAILED DESCRIPTION OF THE DRAWINGS

Figure 6:
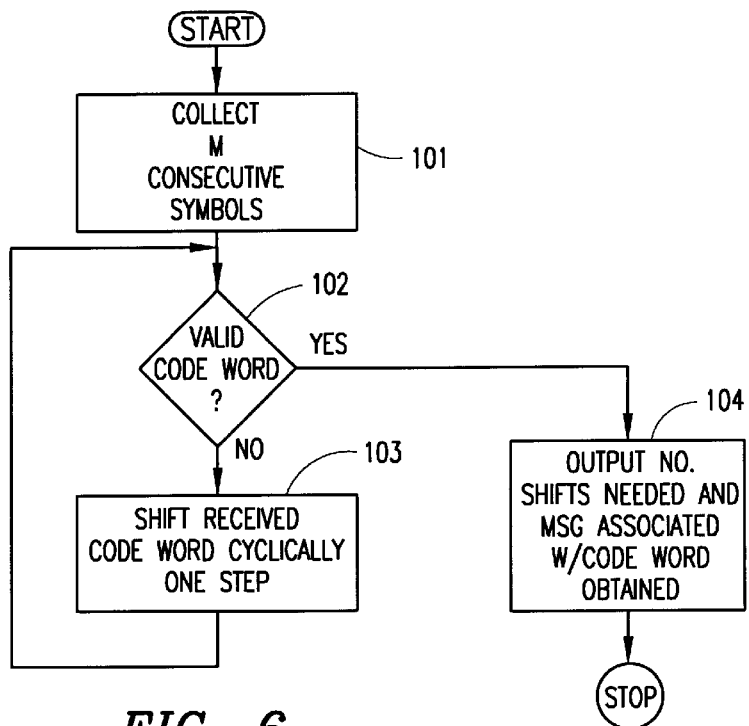
FIG. 6 is a flow diagram that illustrates a generic decoding algorithm that can be used in a receiver decoder for decoding the code word described above with respect to FIG. 5, in accordance with a preferred embodiment of the present invention.

The preferred embodiment of the present invention and its advantages are best understood by referring to FIGS. 1–23D of the drawings, like numerals being used for like and corresponding parts of the various drawings.

Essentially, in accordance with the present invention, a method is provided for more effectively acquiring a long code and frame timing during a cell search, by using a special coding scheme. A code set of length M Q-ary code words including symbols from a set of Q short codes is defined with certain properties. The primary property to be satisfied is that no cyclic shift of a code word yields a valid code word. The other properties to be satisfied are that there is a one-to-one mapping between a long code message and a valid code word, and a decoder should be able to find both the random shift (thereby implicitly finding the frame timing) and the transmitted code word (i.e., its associated long code indication message) in the presence of interference and noise, with some degree of accuracy and reasonable complexity.

More specifically, to illustrate the environment, assume that a transmitter transmits M symbols selected from a Q-ary alphabet (e.g., an alphabet comprising Q orthogonal short codes of length N). These transmitted symbols constitute a transmitted code word, and the set of length M Q-ary sequences (code words) can be referred to as the code. Also, the same code word is transmitted over and over again.

A receiver (of these transmitted code words) knows when in time a symbol starts and stops, but not when a code word starts and stops. Also, the transmitted signal is subject to fading, interference, and/or noise. As such, the receiver's purpose is to (1) extract the transmitted code word (and corresponding message) possibly without prior knowledge of its start/stop times, and (2) extract the start/stop times for the code words. FIG. 5 is a diagram that illustrates the transmitter and receiver operations described directly above.

Referring to FIG. 5, the transmitted symbols are denoted by a,b,c, . . . , etc. Note that in this example, due to the periodicity of the transmitted signal, the symbols a,b,c,d are respectively equal to the symbols f,g,h,i. Also, note that any set of M consecutive symbols contains all information needed for a receiver to decode the received signal assuming that the receiver knows the code's frame timing. In this example, M is equal to 5. If the code's frame timing is unknown, then the decoding process is non-trivial. However, in this example, knowledge of the code's frame timing is assumed for simplicity, along with the use of a code having certain known properties. At the receiver (RX), it can be seen that any one of the set of consecutive symbols in the M=5 shifts can contain the information needed for decoding the received signal.

Notably, for simplicity sake, it can be assumed that the time interval between symbols is zero in the following description. Also, it can be assumed that a conventional decoding method is used to ensure that disturbed symbols corresponding to a code word are extracted with an acceptable degree of reliability.

A channel (as viewed from a receiver) can be described as introducing random symbol errors due to interference and noise, which can shift the code words a random number of (complete) Q-ary symbols. The transmitter re-transmits the same message over and over again. Consequently, any M of the received consecutive symbols (regardless of their position) can represent the code word, up to some unknown cyclic shift. As such, a code set of length M Q-ary code words (with symbols from the set of Q short codes) are defined with the following properties.

Property 1: There is a one-to-one mapping between a long code message and a valid code word (there are L code words or messages);

Property 2: No cyclic shift (of the Q-ary symbols) of a code word yields a valid code word (unless the number of shifts is zero or a multiple of M, which is a trivial solution); and Property 3: The decoder should be able to find both the random shift (thereby implicitly defining the frame timing) and the transmitted code word (i.e., its associated long code information or LCI message) in the presence of interference and noise, with some degree of accuracy at preferably a reasonable degree of complexity. Notably, as described in detail below, the preferred embodiment of the present invention employs codes that primarily satisfy Property 2. Also as described below, it follows that these codes also satisfy Properties 1 and 3.

First, to further facilitate an understanding of the present invention, consider a (simplified) channel in which no bit/symbol errors occur, and only an unknown number of cyclic symbol shifts of the unknown repeatedly transmitted code word occur. A receiver has to decide on both the actual shift and the code word that was transmitted.

FIG. 6 is a flow diagram that illustrates a generic decoding algorithm that can be used in a receiver decoder for decoding the code word described above (albeit not the most efficient decoding method), in accordance with a preferred embodiment of the present invention. At step 101, the decoder collects M consecutive symbols (the received word). Next, at step 102, the decoder determines whether the received word is a valid code word. If not, the decoder performs step 103. Otherwise, the decoder performs step 104.

As such, if the received word is not a valid code word, at step 103, the decoder shifts the received word cyclically one step (symbol), and then returns to perform step 102. Alternatively, at step 104, the decoder outputs the number of shifts it took (in step 103) to obtain the valid code word, and the message associated with the code word thus obtained. The number of shifts output at step 104 yields the code word's frame timing.

Figure 7:
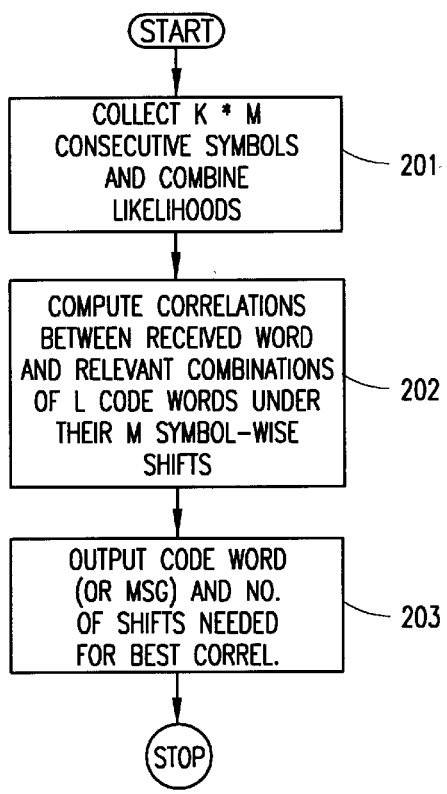
FIG. 7 is a flow diagram that illustrates a generic maximum likelihood decoder algorithm that can be used in a receiver decoder for decoding the code word described above with respect to FIG. 5 in the presence of random symbol/bit interference/noise, in accordance with a second embodiment of the present invention.

FIG. 7 is a flow diagram that illustrates a generic maximum likelihood decoder algorithm that can be used in a receiver decoder for decoding the code word described above in the presence of random symbol/bit interference/ noise (also not the most efficient approach, however), in accordance with a second embodiment of the present invention. The generic maximum likelihood decoder algorithm provides an estimate or probability as to how likely the received bits make up and are, in fact, a code word. The estimate or probability is in the form of a likelihood value. In this exemplary embodiment, the present invention makes it possible to collect k*M symbols before actually decoding the received word, which provides a better estimate of the decoded word than the first above-described method, since a multiplicity (k) of copies of all the code symbols are obtained.

Employing the exemplary maximum likelihood decoder algorithm of this embodiment, at step 201, the decoder collects k*M consecutive symbols (the received word) and combines the symbols' likelihood values. At step 202, for each of L code words and each of the M cyclic symbol shifts, the decoder computes the correlations between the received word and the relevant combinations of the L code words under their M symbol-wise shifts. The decoder stores both the code word and number of shifts needed that resulted in the best correlation. At step 203, the decoder outputs the stored code word (or corresponding message) and number of shifts that resulted in the best correlation.

In accordance with a third embodiment of the present invention, a more efficient decoding algorithm is now described, along with an example that illustrates the existence of codes which can satisfy Properties 1–3. Essentially, in accordance with this exemplary embodiment, the present decoding algorithm combines a so-called tailbiting trellis code and a synchronization code such that all of the Properties 1–3 are satisfied. As such, a code is constructed by concatenating an inner trellis code with an outer code having synchronization properties, so that the overall code constructed satisfies Property 2. It follows that Properties 1 and 3 will also be satisfied.

Specifically, in accordance with this exemplary embodiment of the present invention, first consider (by way of example only) a binary input tailbiting inner trellis encoder that produces Q-ary symbols. These symbols can represent a complex scalar or complex vector signal. Assume that a binary input frame of length M bits is provided. Given that input, the starting state that the encoder should be in, in order to end up in the same state, can be computed as follows. For polynomial encoders of degree m, the starting state can be set to equal the last m bits in the input frame. Consequently, the encoder and decoder both start and end in the same state. However, that state is unknown to the decoder. As such, the valid code words are those that can be obtained by starting in a certain state, moving through the trellis, and ending up in the same state as the starting state.

Figure 8:
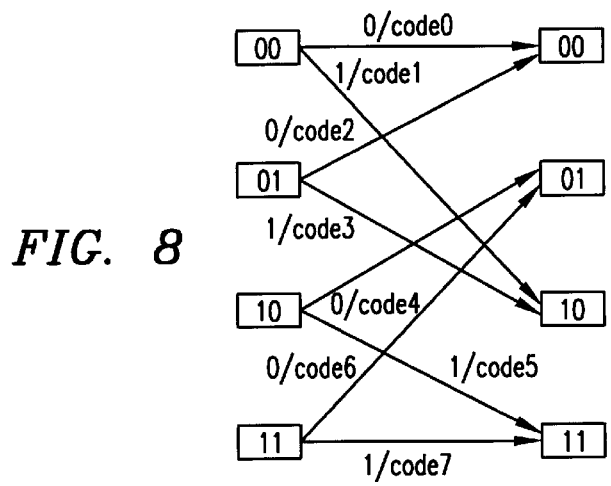
FIG. 8 is a diagram that shows an exemplary trellis section for an m=2 trellis encoder, which is provided for illustrative purposes in order to clarify the present invention.

FIG. 8 is a diagram that shows an exemplary trellis section for an m=2 trellis encoder, which is provided for illustrative purposes. The four boxes arranged vertically on the right side of FIG. 8 represent the four possible shift register states for the m=2 trellis encoder, with the contents indicated inside those boxes. A complete trellis comprises M concatenated sections identical to the trellis section shown in FIG. 8.

For a tailbiting trellis encoder, the trellis wraps around and the last state column becomes the same as the first. The labeled arrows (e.g., I/code 1) indicate that given a current state of the encoder (the state from which the arrow originates) and an input signal (I), the current output symbol is the code (1), and the next state will be the one at which the arrow is pointing. Note that the arrows shown in FIG. 8 have distinct labels, but the invention is not intended to be so limited. The code labels shown are provided for illustrative purposes only and not intended to specify the particular mapping function used.

Figure 9:
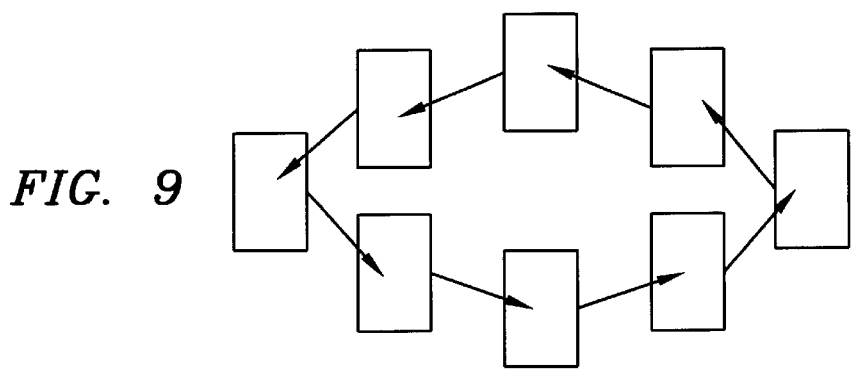
FIG. 9 is a schematic diagram of an exemplary circular trellis with M equal to 8, which is provided for illustrative purposes in order to clarify the present invention.

As illustrated by the trellis section shown in FIG. 8, all trellis stages in the trellis code are identical, and the same code is repeated over and over again. Consequently, the code word path can be viewed as a path in a circular trellis, as shown in FIG. 9. As such, FIG. 9 is a schematic diagram of an exemplary circular trellis with M equal to 8. Each box shown represents a state column (e.g., such as one of the right/left columns shown in FIG. 8), and each arrow shown represents a set of possible state transitions and the corresponding input/output relationship. As mentioned earlier, in accordance with the present invention, all trellis stages shown are identical. Consequently, any cyclic shift of an output sequence of symbols is also a valid output sequence. As such, in the path of the circular trellis, the start and stop states are the same, but the actual position in the trellis where the start/stop states occur is unknown.

The decoder employed collects M successive received symbols and assumes a start/stop state position in the trellis. All cyclic shifts of the valid paths are also valid paths. Consequently, the correct path (but not the start/stop position) can be decoded (assuming that the noise level is not too high). Notably, although this tailbiting encoder algorithm does not satisfy Property 2 (above), all symbol-wise cyclic shifts of a code word are valid code words. However, using such a trellis structure readily allows the use of soft decision decoding techniques and the structured trellis diagram for more efficient decoding. An overview of known techniques that can be used for decoding tailbiting trellis codes is provided in "An Efficient Adaptive Circular Viterbi Algorithm for Decoding Generalized Tailbiting Convolutional Codes" by R. Cox and C-E. Sundberg, IEEE Transactions on Vehicular Technology, Vol. 43, No. 1 1994, and U.S. Pat. No. 5,355,376 to R. Cox et al. As such, assuming that the correct path has been decoded (most often the case), a circularly-shifted version of the input M-bit frame can be obtained.

In order to constrain the above-described inner code words so that Property 2 is satisfied, an outer synchronization code of length M bits is introduced that constitutes this M-bit frame. As described below, this outer synchronization code satisfies Property 2. Consequently, by viewing both the inner and outer codes as a single code, this resulting single code satisfies Property 2.

Once the inner code has been decoded, a shifted version of the outer code can be obtained. However, only one exact shift of this decoded word yields a valid outer code word. Consequently, the inner decoded word is shifted until a valid code word is obtained. The number of these shifts required defines the frame timing and the message corresponding to the LCI. If a valid code word fails to appear after M shifts are performed, it can be concluded that an inner decoding error has occurred, whereby the present invention thus provides a form of error detection.

The following description illustrates that such synchronization codes (that satisfy Property 2) actually exist, and for small values of M enumerate the code words in the outer code. As such, a trellis code is then defined for a number of different embodiments.

A family of exemplary synchronization codes (and their cardinality) is now described such that each code can satisfy Property 2, in accordance with the present invention. For illustrative purposes, M is set equal to 5 for this example, but the following reasoning applies as well to any value of M. With respect to property 2, a limitation placed on the code words is that any (non-trivial) cyclic shift has to yield a distinct non-code word. As such, the "period" of a word is defined to be the number of cyclic shifts needed to return to that word. In this embodiment, the period is less than or equal to M. A "p-cycle" is defined to be the set of "p" words of period "p" that is obtained when shifting a period "p" word. A limitation placed on each code word is that it have a period M, and that the M-1 shifts are not code words. Given the above, the following algorithm shown in FIG. 10 can be used by an encoder to generate all words that satisfy Property 2.

Figure 10:
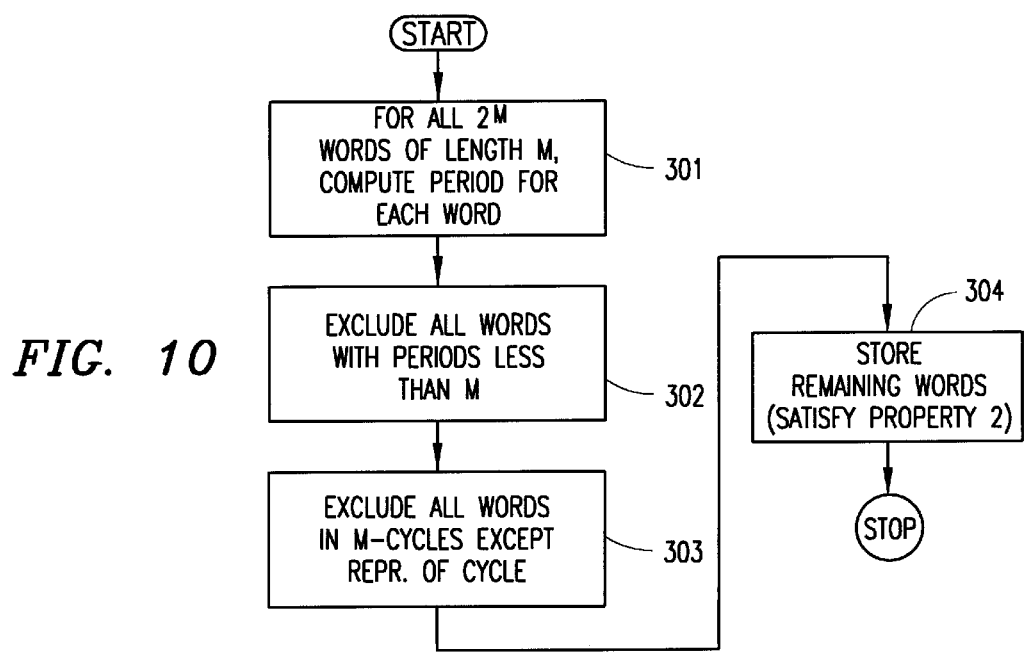
FIG. 10 is a flow diagram of an exemplary algorithm that can be used by an encoder to generate all words that satisfy Property 2 of the present invention.
Figures 11, 12:
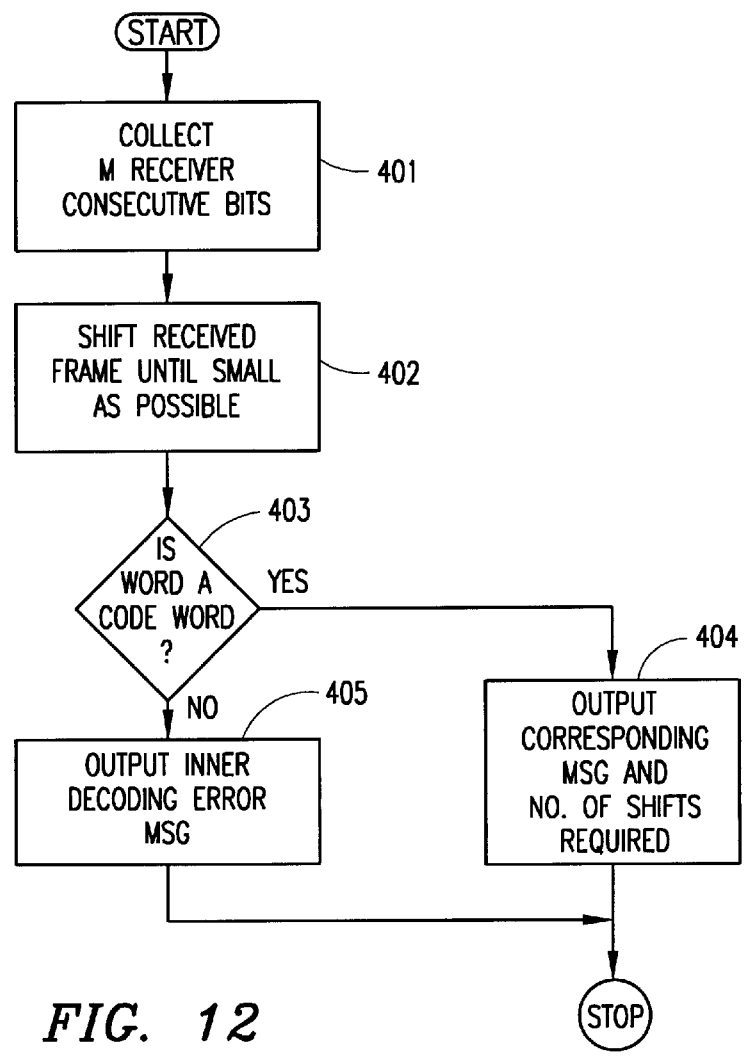
FIG. 11 illustrates a synchronization code that can result from implementing the encoding algorithm described with respect to FIG. 10.
FIG. 12 is a flow diagram that illustrates a method for decoding the exemplary synchronization code described above with respect to FIG. 11, in accordance with the present invention.

Referring to FIG. 10, at step 301, for all $2^M$ words of length M, the encoder computes the period of the words. At step 302, the encoder then excludes from consideration all words with periods less than M. At step 303, the encoder excludes all of the words in the M-cycles except one that can represent the cycle (e.g., the smallest one if the word is viewed as a binary number). At step 304, the encoder assumes that the remaining words satisfy Property 2 and constitute the code of interest. An illustration of the above-described algorithm is shown in FIG. 11. As shown, M is equal to 5. The right-directed arrows (→) indicate that a (e.g., right) cyclic shift has taken place. All $2^5$=32 words are accounted for, and six words remain in the resulting synchronization code (right-most column). Consequently, in this example, the synchronization code of interest comprises the six code words 1,3,5,7,11,15 (decimal), and, therefore, L=6.

FIG. 12 is a flow diagram that illustrates a method for decoding the exemplary synchronization code described above with respect to FIG. 11, in accordance with the present invention. At step 401, a decoder collects M consecutive bits (obtained from the inner decoding). At step 402, the decoder shifts the received frame until it is as small as possible (e.g., viewed as a binary number), at the most M times. At step 403, the decoder determines whether the resulting word is a code word. If so, at step 404, the decoder outputs the code word's corresponding message, along with the number of shifts that had been needed to obtain the code word. Otherwise, if not, it can be assumed that an inner decoding error has occurred. In that case, at step 405, the decoder can output an inner decoding error message. FIG. 13 shows a listing for the above-described synchronization code search algorithm, and FIG. 14 shows the cardinality (i.e., indicating quantity but not order) of certain synchronization codes for small values of M.

In a DS-CDMA system, the M code symbols can comprise a number, Q, of so-called short codes of length N. These short codes are often orthogonal to one another, or otherwise have good cross-correlation properties. Consider a low rate, time-invariant trellis code in which the symbols on the trellis branches are vectors taken from the set of Q vectors above (or symbols as referred to herein). For example, U.S. Pat. No. 5,193,094 discloses such a set of vectors.

FIGS. 15A and 15B are block diagrams of exemplary trellis encoders 10 and 20, respectively, that can be used to implement the present invention. Essentially, such a trellis encoder is structured in the form of a length m shift register (12, 22) with an input signal, I, and a mapper (14, 24) that performs a mapping from the state of the respective shift register (12, 22) and the current input signal, I, to an output vector (e.g., c1, c2, . . . , cN). In the trellis encoders 10, 20 shown, the length of the shift register (m) is 3. Consequently, the shift registers 12, 22 can each take on 8 different states. The set of output vectors/symbols (e.g., c1, c2, . . . , cN) constitute a set of orthogonal vectors for the orthogonal trellis encoder 10 (FIG. 15A), and a set of orthogonal or antipodal vectors for the superorthogonal trellis encoder 20 (FIG. 15B).

As such, an orthogonal trellis code is obtained if the mapping from a register state and the input signal, I, yields a vector, and if the set of vectors thus obtained form a set of orthogonal vectors. A superorthogonal code is formed if the first m-1 register states define an orthogonal vector, and can be taken as the output vector unless the modulo 2 sum of the input bit and the m:th register state content is equal to 1. In this case, the output vector is bit-wise inverted by inverter 26. With a typical mapping, such as 0/1→+1/−1, it can be seen that the outputs for a certain state are antipodal vectors depending on the inputs 0 and 1, respectively. As such, for DS-CDMA applications, such codes are suitable to use as symbols because of the inherent spreading effect (very low code rate), good correlation properties, and inherent error correcting capabilities due to the trellis structure.

In addition to the novel coding (decoding) method described above in accordance with the present invention, a novel method is also provided for including a Frame Timing Indication (FTI) for cell searching using the coding scheme of the present invention, for example, in the context of the ARIB proposal for a Wideband CDMA cell search scheme. As such, the acquisition-related channels transmitted in the downlink described in the current ARIB Wideband CDMA proposal facilitates a three-step acquisition procedure in the mobile station involved. However, since these acquisition-related channels do not include any information about the frame timing, the final step of the proposed ARIB procedure is rather complex and/or time consuming. As described below, the present invention provides at least two methods that can be used to provide a FTI, for example, within the framework of the proposed ARIB Wideband CDMA scheme.

Specifically, FIG. 16 is a diagram that illustrates the cell search method to be performed by a mobile station, as described in the ARIB Wideband CDMA proposal. In each slot, a Primary Synchronization Code (PSC) and Secondary Synchronization Code (SSC) are transmitted in parallel, both with known modulation but without long code scrambling. The duration of the PSC/SSC is one symbol of the 16 ksymbols/sec physical channel, or 256 chips. There are $N_{SSC}$ valid SSCs in the system, which give $\log_2(N_{SSC})$ bits of information to be used for a LCI. The characteristics of the PSC and SSC are summarized in the table shown in FIG. 17. As illustrated by FIG. 17, no FTI is provided to the mobile station, which can cause the cell search to take much longer than necessary.

FIG. 18 is a table that shows information that can be provided by a PSC/SSC for cell searches, in accordance with the present invention. Although this information can be provided in a number of ways, two exemplary embodiments are described below that can be used for the currently proposed cell searching schemes.

Specifically, in accordance with one embodiment of the invention (as illustrated by FIG. 19), as in the proposed ARIB scheme, the SSC is the same in each slot in a frame, and there are $N_{SSC}$ valid SSCs in the system, which give $\log_2(N_{SSC})$ bits of information to be used for the LCI. The SSCs throughout the frame are further modulated by one Of $N_{MOD}$ possible valid (e.g., binary) sequences of length 16. This method provides the LCI and another $\log_2(N_{MOD})$ bits of information for LCI usage. The resulting modulating sequences of length 16 have good auto-correlation properties.

If the value of $N_{MOD}$ is greater than 1, the following properties also need to be satisfied: (1) good cross-correlation; and (2) no cyclic shift of any valid modulating sequence can result in another valid modulating sequence (and any cyclic shift thereof). If the modulating sequences thus obtained satisfy these properties, the FTI is known as soon as any valid modulating sequence has been detected in the mobile station's receiver. Coherent detection of the received signal is facilitated by using the PSCs as reference symbols to obtain a channel phase reference. As such, the FTI is inherent. Consequently, all $\log_2(N_{SSC})+\log_2(N_{MOD})$ bits of information can be used for the LCI.

In accordance with a second embodiment of the invention (as illustrated by FIG. 20), there is a sequence of 16 SSCs that repeats in each frame. In general, there are $N_{SSC\_SEQ}$ such SSC sequences that can be used in the system, which produces $\log_2(N_{SSC\_SEQ})$ bits of information that can be used for the LCI. In that case, it is advantageous if each SSC sequence is unique, and the individual SSCs have good auto-and cross-correlation properties. However, it may be assumed that the value $N_{SSC\_SEQ}=1$ will suffice in a practice.

In finding a valid SSC sequence, the FTI is inherently produced, and the SSC sequence can also be modulated as illustrated by the method described directly above for the first embodiment, which produces $\log_2(N_{MOD})$ bits of information for LCI usage. In this case, the LCI can take on 65,536 different values (more than enough), which provides good LCI detection performance.

FIG. 21 is a table that describes two cell search algorithms (methods) that can be used to implement the present invention. Also, the table shown in FIG. 21 provides a comparison of the two exemplary cell search methods of the present invention with the current ARIB Wideband CDMA cell search proposal. The rows (steps) in FIG. 21 describe the cell search stages involved. For example, in the first stage (step 1), a matched filter (MF) is used to produce the slot timing (ST). In the second stage, when correlating (CORR) with the SSC in the second stage, since the PSC provides a phase reference, the correlations can be coherently accumulated. On the other hand, the correlations can be performed only once per slot, because there is only one SSC per slot. When correlating with the long code (LC) in the third stage, the correlations have to be non-coherently accumulated. However, this correlation can be accomplished over consecutive symbols, since the long code is applied to each symbol in the frame. In that case, the correlation is performed by concatenating the long code and the known short code of the BCCH, which is always transmitted on the downlink. If the long code can be pinpointed by the LCI, only one correlation step is necessary with the two exemplary embodiments described above. However, with the currently proposed ARIB cell search scheme, a search is still required in addition to the steps described above, in order to find the frame timing (FT).

In order to exemplify the receiver operations needed for the methods shown in FIG. 21, the following selections can be made: $N_{SSC}$=256 long codes grouped as 16×16; $N_{MOD}$=1; $N_{SSC\_SEQ}$=1; and assume (for simplicity) that a coherent accumulation of 16 correlations (256 chips each) is sufficient for adequate detection. As such, in implementing the currently proposed ARIB cell searching scheme, the following correlation matrix is is formed:

$$Z_1 = \begin{bmatrix} \bar{c}_0 \cdot \bar{y}_0 & \bar{c}_0 \cdot \bar{y}_1 & \cdots & \bar{c}_0 \cdot \bar{y}_{15} \\ \bar{c}_1 \cdot \bar{y}_0 & \bar{c}_1 \cdot \bar{y}_1 & \cdots & \bar{c}_1 \cdot \bar{y}_{15} \\ \vdots & \vdots & \vdots & \vdots \\ \bar{c}_{15} \cdot \bar{y}_0 & \cdots & \cdots & \bar{c}_{15} \cdot \bar{y}_{15} \end{bmatrix} \quad (1)$$

where the $\bar{c}_i$ represent the 16 different SSCs, the $\bar{y}_i$ represent 16 consecutively received SSCs, and the dot product denotes that correlation is performed. With 16 correlators in the mobile station's receiver, the 16 correlators need to be operated for 16 slots, in order to form the 256 correlations of $Z_1$. The elements of $Z_1$ can also be multiplied by the conjugate of the corresponding PSC correlations, in order to remove the phase shift resulting from the radio channel and frequency synchronization errors. As such, this multiplication can be assumed to have already been performed in the matrix (1) above, and also throughout the remaining description. The rows of $Z_1$ are then summed. One of these sums will have a larger magnitude than the rest, which indicates the SSC.

In accordance with the first embodiment (method 1 above), the matrix (1) is also formed. However, to implement method 1, the matrix (1) is further multiplied with the following matrix:

$$M_1 = \begin{bmatrix} m_0 & m_1 & \cdots & m_{15} \\ m_1 & m_2 & \cdots & m_0 \\ \vdots & \vdots & \vdots & \vdots \\ m_{15} & m_0 & \cdots & m_{14} \end{bmatrix} \quad (2)$$

where the columns contain all cyclic shifts of the modulating sequence (assumed to be real values herein for simplicity).

The multiplication, $Z_1M_1$, produces a 16×16 matrix, where one of the elements would have a larger magnitude than the rest. The row index of this element produces the LCI, and the column index produces the frame timing (FTI).

In accordance with the second embodiment of the invention (method 2 above), instead of the matrix (1), the following matrix is formed:

$$Z_2 = \begin{bmatrix} \bar{c}_0 \cdot \bar{y}_0 & \bar{c}_1 \cdot \bar{y}_1 & \cdots & \bar{c}_{15} \cdot \bar{y}_{15} \\ \bar{c}_1 \cdot \bar{y}_0 & \bar{c}_2 \cdot \bar{y}_1 & \cdots & \bar{c}_0 \cdot \bar{y}_{15} \\ \vdots & \vdots & \vdots & \vdots \\ \bar{c}_{15} \cdot \bar{y}_0 & \bar{c}_0 \cdot \bar{y}_1 & \cdots & \bar{c}_{14} \cdot \bar{y}_{15} \end{bmatrix} \quad (3)$$

where the $\bar{c}_i$ are the SSCs of the SSC sequence. The matrix (3) is then multiplied by the following matrix:

$$M_2 = \begin{bmatrix} m_0^{(0)} & m_0^{(1)} & \cdots & m_0^{(15)} \\ m_1^{(0)} & m_1^{(1)} & \cdots & m_1^{(15)} \\ \vdots & \vdots & \vdots & \vdots \\ m_{15}^{(0)} & m_{15}^{(1)} & \cdots & m_{15}^{(15)} \end{bmatrix} \quad (4)$$

where the columns represent all of the 16 possible modulating sequences (again assuming real values for simplicity). The matrix multiplication, $Z_2M_2$, again yields a 16×16 matrix, where one of the elements would have had a larger magnitude than the rest. The row index of this element produces the FTI, and the column index produces the LCI.

The operations for the above-described methods of the invention can be extended to include more general cases. For example, if more modulating sequences are desired, the matrix M1(M2) can be expanded with new columns containing all shifts of all allowed m-sequences. If more SSC sequences are desired in implementing the second method above, the matrix, $Z_2$, can be expanded by adding rows of shifted correlations with all allowed SSC sequences. If there are more long codes per group, then the matrix, $Z_1$, described above for the first method can be expanded by adding more rows of correlations. As such, with a limited set of correlators in use, the correlations can be performed in subsequent frames, and still be coherently accumulated. This observation is valid for both of the above-described cell search methods of the invention.

The following description compares the two cell search methods of the invention with the proposed ARIB Wideband CDMA cell search scheme. In order to make that comparison, assume that the system parameters shown in the table in FIG. 22 apply for each of the following cases. FIGS. 23A–D are tables that illustrate the advantages of the two cell search methods of the present invention over the proposed ARIB Wideband CDMA cell search method. For example, the table in FIG. 23A shows the number of 256-chip correlations needed, and the time required to achieve downlink synchronization for the three cell search schemes, for the case where there is no long code grouping involved. The table in FIG. 23B shows the same information for the case where there are four long code groups of 32 codes each involved. The table in FIG. 23C shows the same information for the case where there are 16 long code groups of 16 codes each involved. The table in FIG. 23D shows the same information for the case where there are 32 long code groups of 4 codes each involved.

As such, the first step (the matched filtering or MF stage) is the same for all of the three methods. Consequently, this step is omitted from the tables in FIGS. 23A–D for simplicity sake. For some of the correlations, a maximum and average value is given. The reason for that is when blind searches are performed for the LC or the FT, the correlation process can be terminated before all possible combinations have been searched, when a sufficiently good match has been obtained. When performing blind searches, (e.g., among N different codes), on average N/2 codes have to be tested. However, for the worst case, all of the N codes may have to be tested. As such, the matrix multiplications, $Z_I M_I$, can be assumed to be performed instantly, and their complexity is thus not considered in the tables above. In summary, as illustrated by FIGS. 23A–D, the two exemplary cell search methods described above and performed in accordance with the present invention, facilitate a faster, less complex cell search process in the mobile station involved, both at initial synchronization and during handover measurement reporting situations. Also, as the tables in FIGS. 23A–D show, both the delay and complexity of the cell search methods of the present invention are lower than those for the ARIB proposed cell search method. In particular, the third stage (step 3) of the mobile station's cell search procedure implemented with the two methods of the invention, is up to 16 times faster and less complex than with the proposed ARIB method.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for facilitating cell searches in a cellular communications system, comprising the steps of:

a base station generating an identifying code set for transmission, said identifying code set comprising a plurality of code words including a plurality of symbols from a set of short codes, each code word of said plurality of code words defined such that no symbol-wise cyclic shift of said each code word produces a valid code word; and said base station transmitting said generated identifying code set formed by concatenating an inner and outer code.

2. The method of claim 1, wherein said plurality of code words comprises a plurality of Q-ary code words, and said set of short codes comprises a set of Q short codes.

3. The method of claim 2, wherein said plurality of Q-ary code words comprises a plurality of length M Q-ary code words.

4. The method of claim 1, wherein said inner code comprises a tailbiting trellis code.

5. The method of claim 4, wherein said tailbiting trellis code comprises an orthogonal trellis code.

6. The method of claim 4, wherein said tailbiting trellis code comprises a superorthogonal trellis code.

7. The method of claim 1, wherein said outer code comprises a binary code.

8. A method for a mobile station to decode an identifying code transmitted from a base station in a CDMA cellular communications system, comprising the steps of:

receiving a plurality of consecutive symbols comprising said identifying code;

determining whether said received plurality of consecutive symbols comprises a valid code word; and if said received plurality of consecutive symbols does not comprise a valid code word, cyclically shifting said received plurality of consecutive symbols by a predetermined amount, and returning to the determining step;

if said received plurality of consecutive symbols comprises a valid code word, outputting a number of cyclical shifts made to obtain said valid code word and a message associated with said valid code word.

9. The method of claim 8, wherein said number of cyclical shifts made to obtain said valid code word indicates a frame timing for said valid code word.

10. The method of claim 8, wherein said plurality of consecutive symbols comprises a predetermined number of consecutive symbols.

11. The method of claim 8, wherein said predetermined amount comprises one symbol.

12. A method for a mobile station to decode an identifying code transmitted from a base station in a CDMA cellular communications system, comprising the steps of:

collecting k times M consecutive symbols, said M consecutive symbols comprising said identifying code;

calculating a combined likelihood value for said collected k times M consecutive symbols;

for each of L code words and each of M cyclic shifts of said collected consecutive symbols, computing a correlation between said k times M collected consecutive symbols and all of M times L consecutive symbols obtained; and storing a code word and number of cyclical shifts made that produced a highest amount of correlation in the computing step.

13. The method of claim 12, wherein said number of cyclical shifts made indicate a frame timing for said identifying code.

14. The method of claim 12, further comprising the step of outputting a message associated with said stored code word.

15. A method for encoding an identifying code to be transmitted from a base station in a CDMA cellular communications system, comprising the steps of:

computing a period for each of $2^M$ words of length M to be encoded as said identifying code;

excluding each of said $2^M$ words that has a period less than M;

for each of M cycles of a remainder of said $2^M$ words, determining a representative word; and storing each said representative word.

16. The method of claim 15, wherein each said stored representative word includes a plurality of code words and no cyclic shift of any one of said plurality of code words produces a valid code word.

* * * * *

UNITED STATES PATENT AND TRADEMARK OFFICE
CERTIFICATE OF CORRECTION

PATENT NO.    : 6,185,244 B1
DATED         : February 6, 2001
INVENTOR(S)   : Per Johan Anders Nyström It is certified that error appears in the above-identified patent and that said Letters Patent is hereby corrected as shown below:

<u>Title page,</u>
Item [75], delete "; Karim Jamal Vällingby"; "Raiz Esmailzadeh, Yokohama (JP);" and "Yi-Pin Eric Wang, Cary, NC (US)"

Signed and Sealed this

Third Day of June, 2003

JAMES E. ROGAN
*Director of the United States Patent and Trademark Office*